(12) United States Patent
Elliott

(10) Patent No.: US 7,324,647 B1
(45) Date of Patent: Jan. 29, 2008

(54) QUANTUM CRYPTOGRAPHIC KEY DISTRIBUTION NETWORKS WITH UNTRUSTED SWITCHES

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 1069 days.

(21) Appl. No.: 09/944,328

(22) Filed: Aug. 31, 2001

Related U.S. Application Data

(60) Provisional application No. 60/242,597, filed on Oct. 23, 2000.

(51) Int. Cl.
- *H04L 9/00* (2006.01)
- *G06F 12/14* (2006.01)
- *H04L 12/28* (2006.01)
- *H04L 12/56* (2006.01)

(52) U.S. Cl. ............... 380/278; 380/239; 380/255; 370/390; 370/400; 713/192

(58) Field of Classification Search ........ 380/255–256, 380/268, 33, 47, 277–279, 44, 283; 726/2, 726/13–14; 709/223–229
See application file for complete search history.

(56) References Cited

U.S. PATENT DOCUMENTS

| | | | |
|---|---|---|---|
| 4,445,116 A | 4/1984 | Grow | |
| 4,649,233 A | 3/1987 | Bass et al. | |
| 4,770,535 A | 9/1988 | Kim et al. | |
| 5,058,973 A | 10/1991 | Refregier et al. | |
| 5,157,461 A | 10/1992 | Page | |
| 5,243,649 A | 9/1993 | Franson | 380/9 |
| 5,307,410 A * | 4/1994 | Bennett | 380/256 |
| 5,311,572 A | 5/1994 | Friedes et al. | |
| 5,325,397 A | 6/1994 | Scholz et al. | |
| 5,339,182 A * | 8/1994 | Kimble et al. | 398/158 |
| 5,400,325 A * | 3/1995 | Chatwani et al. | 370/399 |

(Continued)

FOREIGN PATENT DOCUMENTS

WO    WO 96/07951    3/1996

(Continued)

OTHER PUBLICATIONS

Zhang, Xian-Mo and Zhen, Yuliang. "Cryptographically Functions". Sep. 1997. IEEE Transactions on Information Theory, vol. 43, No. 5, pp. 1740-1747. Found on the World Wide Web at: http://ieeexplore.ieee.or/iel3/18/13537/00623184.pdf?tp =&arnumber=623184&insnumber=13537.*

(Continued)

*Primary Examiner*—Ayaz Sheikh
*Assistant Examiner*—Jeremiah Avery
(74) *Attorney, Agent, or Firm*—Ropes & Gray LLP

(57) ABSTRACT

Methods and systems are disclosed in which information is securely transmitted in a network comprising untrusted network devices. Setup messages are sent to a networking device, and based on the setup messages, light directing devices are configured to direct light along a path from an origin endpoint to a terminal endpoint, thus providing a path through the network. Through the path, a stream of light information is sent using a plurality of light pulses to carry out quantum-cryptographic key distribution.

33 Claims, 8 Drawing Sheets

U.S. PATENT DOCUMENTS

| | | | |
|---|---|---|---|
| 5,414,771 A | 5/1995 | Fawcett, Jr. | 380/44 |
| 5,469,432 A | 11/1995 | Gat | |
| 5,502,766 A | 3/1996 | Boebert et al. | |
| 5,515,438 A | 5/1996 | Bennett et al. | |
| 5,535,195 A | 7/1996 | Lee | |
| 5,602,916 A | 2/1997 | Grube et al. | |
| 5,675,648 A | 10/1997 | Townsend | 380/21 |
| 5,710,773 A | 1/1998 | Shiga | |
| 5,720,608 A | 2/1998 | Aoki et al. | |
| 5,729,608 A | 3/1998 | Janson et al. | |
| 5,732,139 A | 3/1998 | Lo et al. | 380/28 |
| 5,757,912 A * | 5/1998 | Blow | 380/256 |
| 5,764,765 A | 6/1998 | Phoenix et al. | |
| 5,764,767 A | 6/1998 | Beimel et al. | |
| 5,768,378 A * | 6/1998 | Townsend et al. | 380/256 |
| 5,768,391 A | 6/1998 | Ichikawa | |
| 5,805,801 A | 9/1998 | Holloway et al. | |
| 5,850,441 A * | 12/1998 | Townsend et al. | 380/283 |
| 5,911,018 A | 6/1999 | Bischel et al. | |
| 5,953,421 A | 9/1999 | Townsend | 380/21 |
| 5,960,131 A | 9/1999 | Fouquet et al. | 385/17 |
| 5,960,133 A | 9/1999 | Tomlinson | 385/18 |
| 5,966,224 A | 10/1999 | Hughes et al. | 359/112 |
| 6,005,993 A | 12/1999 | MacDonald | 385/16 |
| 6,028,935 A * | 2/2000 | Rarity et al. | 380/256 |
| 6,052,465 A | 4/2000 | Gotoh et al. | |
| 6,097,696 A | 8/2000 | Doverspike | |
| 6,122,252 A | 9/2000 | Aimoto et al. | |
| 6,130,780 A | 10/2000 | Joannopoulos et al. | 359/584 |
| 6,145,024 A | 11/2000 | Maezawa et al. | |
| 6,151,586 A | 11/2000 | Brown | |
| 6,154,586 A | 11/2000 | MacDonald et al. | |
| 6,160,627 A | 12/2000 | Ahn et al. | |
| 6,160,651 A | 12/2000 | Chang et al. | |
| 6,188,768 B1 | 2/2001 | Bethune et al. | |
| 6,208,935 B1 | 3/2001 | Yamada et al. | |
| 6,233,075 B1 * | 5/2001 | Chang et al. | 398/79 |
| 6,233,393 B1 | 5/2001 | Yanagihara et al. | |
| 6,289,104 B1 | 9/2001 | Patterson et al. | |
| 6,341,127 B1 | 1/2002 | Katsube et al. | |
| 6,378,072 B1 | 4/2002 | Collins et al. | |
| 6,463,060 B1 | 10/2002 | Sato et al. | |
| 6,507,012 B1 | 1/2003 | Medard et al. | |
| 6,519,062 B1 | 2/2003 | Yoo | |
| 6,522,749 B2 | 2/2003 | Wang | |
| 6,529,498 B1 | 3/2003 | Cheng | |
| 6,532,543 B1 | 3/2003 | Smith et al. | |
| 6,538,990 B1 | 3/2003 | Prorock | |
| 6,539,410 B1 * | 3/2003 | Klass | 708/255 |
| 6,556,544 B1 * | 4/2003 | Lee | 370/256 |
| 6,560,707 B2 | 5/2003 | Curtis et al. | |
| 6,563,796 B1 | 5/2003 | Saito | |
| 6,594,055 B2 | 7/2003 | Snawerdt | |
| 6,605,822 B1 | 8/2003 | Blais et al. | |
| 6,646,727 B2 | 11/2003 | Saleh et al. | |
| 6,647,010 B1 | 11/2003 | Ford et al. | |
| 6,650,805 B2 | 11/2003 | Chen et al. | |
| 6,654,346 B1 | 11/2003 | Mahalingaiah et al. | |
| 6,661,806 B1 | 12/2003 | Eriksson et al. | |
| 6,678,379 B1 | 1/2004 | Mayers et al. | |
| 6,684,335 B1 | 1/2004 | Epstein et al. | |
| 6,720,589 B1 * | 4/2004 | Shields | 257/194 |
| 6,721,269 B2 * | 4/2004 | Cao et al. | 370/227 |
| 6,728,281 B1 | 4/2004 | Santori et al. | |
| 6,748,434 B2 | 6/2004 | Kavanagh | |
| 6,754,214 B1 | 6/2004 | Mahalingaiah | |
| 6,778,557 B1 | 8/2004 | Yuki et al. | |
| 6,799,270 B1 | 9/2004 | Bull et al. | |
| 6,801,626 B1 * | 10/2004 | Nambu | 380/256 |
| 6,836,463 B2 | 12/2004 | Garcia-Luna-Aceves et al. | |
| 6,862,564 B1 | 3/2005 | Shue et al. | |
| 6,873,797 B2 * | 3/2005 | Chang et al. | 398/51 |
| 6,882,431 B2 | 4/2005 | Teich et al. | |
| 6,895,091 B1 | 5/2005 | Elliott et al. | |
| 6,895,092 B2 | 5/2005 | Tomita | |
| 6,897,434 B1 | 5/2005 | Kumar et al. | |
| 6,934,472 B2 * | 8/2005 | Chang et al. | 398/51 |
| 6,986,056 B1 | 1/2006 | Dultz et al. | |
| 7,028,059 B2 | 4/2006 | Williams | |
| 7,035,411 B2 | 4/2006 | Azuma et al. | |
| 2001/0038695 A1 | 11/2001 | Kim | |
| 2002/0015573 A1 | 2/2002 | Ishibashi | |
| 2002/0021467 A1 | 2/2002 | Ofek et al. | |
| 2002/0025041 A1 | 2/2002 | Tomita | |
| 2002/0097874 A1 | 7/2002 | Foden et al. | |
| 2002/0110245 A1 | 8/2002 | Gruia | |
| 2002/0141019 A1 | 10/2002 | Chang et al. | |
| 2003/0002074 A1 | 1/2003 | Nambu et al. | |
| 2003/0002670 A1 | 1/2003 | Wang | |
| 2003/0002674 A1 | 1/2003 | Nambu et al. | |
| 2003/0059157 A1 | 3/2003 | DeCusalis et al. | |
| 2003/0137944 A1 | 7/2003 | Medvinsky | |
| 2003/0180042 A1 | 9/2003 | Nelles et al. | |
| 2003/0215088 A1 | 11/2003 | Bao | |
| 2003/0231771 A1 | 12/2003 | Gisin et al. | |
| 2004/0005056 A1 | 1/2004 | Nishioka et al. | |
| 2004/0008843 A1 | 1/2004 | Van Enk | |
| 2004/0019676 A1 | 1/2004 | Iwatsuki et al. | |
| 2004/0109564 A1 | 6/2004 | Cerf et al. | |
| 2004/0136321 A1 | 7/2004 | Ren et al. | |
| 2004/0165884 A1 | 8/2004 | Al-Chalabi | |
| 2004/0190725 A1 | 9/2004 | Yuan et al. | |
| 2005/0036624 A1 | 2/2005 | Kent et al. | |
| 2005/0094818 A1 | 5/2005 | Inoue et al. | |
| 2006/0252381 A1 | 11/2006 | Sasaoka et al. | |

FOREIGN PATENT DOCUMENTS

| | | | |
|---|---|---|---|
| WO | WO 9607951 A1 * | 3/1996 | |

OTHER PUBLICATIONS

Bennett, Charles ZH. and Brassard, Gilles. "Experimental quantum cryptography: the dawn of a new era for quantum cryptography: the experimental prototype is working". Oct. 1989. ACM SIGACT News. vol. 20, issue 4, pp. 78-82. Found on the World Wide Web at: http://doi.acm.org/10.1145/74074.74087.*

Bennett, C.H., et al., "Experimental Quantum Cryptography." J. Cryptology, 5:3-28 (1992).

Bennett, C.H., "Quantum Cryptography Using Any Two Nonorthogonal States," Physical Review Letters, 68(21):3121-3124 (1992).

Butler, W.T., et al. "Free space quantum-key distribution." Physical Review A, 57(4):2379-2382 (Apr. 1998).

Jacobs, B.C., et al., "Quantum cryptography in free space," Optics Letters 21(22):1854-1856 (Nov. 1996).

Bethune, D.S., et al., An Autocompensating Fiber-Optic Quantum Cryptography System Based on Polarization Splitting of Light, IEEE Journal of Quantum Electronics, 36(3):340-347 (2000).

Bennett, C.H. Quantum Cryptography Using Any Two Nonorthogonal States. Physical Review Letters. 68:21, 3121-24 (1992).

Buttler, W.T. et al. Free-space quantum-key distribution. Physical Review A. 57:4, 2379-82 (Apr. 1998).

Jacobs, B.C. et al. Quantum cryptography in free space. Optics Letters. 21:22, 1854-56 (Nov. 1996).

Cabello, A., "Multiparty key distribution and secret sharing based on entanglement swapping." pp. 1-8 (Sep. 7, 2000).

Crepeau, C., et al., "Secure Multi-party Quantum Computation," ACM, pp. 1-10 (20001).

Gottesman, D., et al. "Secure quantum key distribution using squeezed states," pp. 1-19 (Sep. 25, 2000).

Xiao, L., et al., "Efficient Multi-Party Quantum Secret Sharing Schemes," pp. 1-7 (May 28, 2004).

Violations of a New Inequality for Classical Fields; Fransom, J.D.; Johns Hopkins University; NTIS-NASA Publication; Goddard Space Flight Center; Workshop on Squeezed States and Uncertainty Relations, Feb. 1991, pp. 23-32.

Imamoglu, A., et al., "Turnstile Device for Heralded Single Photons: Coulomb Blockade of Electron and Hole Tunneling in Quantum Confined p-i-n Heterojunctions," Physical Review Letters, 72(2):210-213 (1994).

"Quantum key distribution: Real-time compensation interferometer phase drift," NTNU Department of Physical Electronics, pp. 1-45.

Bennett, C.H., et al., "Experimental Quantum Cryptography," Journal of Cryptography's special issue after Eurocrypt '90, 28 pages (Sep. 1991).

Bennett, C.H., et al., "Generalized Privacy Amplification," IBM Research, 24 pages (May 31, 1995).

Brassard, G., et al., "Cryptology Column—25 Years of Quantum Cryptography," Pragocrypt, pp. 13-24 (Jul. 1996).

Brassard, G., et al., "Secret-Key Reconciliation by Public Discussion," Department IRO, Universite de Montreal, 14 pages (1994).

Ekert, A.K., "Quantum Cryptography Based on Bell's Theorem," Physical Review Letters, 67(6):661-663 (1991).

Elliott, B.B., et al., "Path-length control in interferometric QKD link," Proc. of SPIE, vol. #5101, 11 pages (Apr. 21, 2003).

Elliott, C., "Building the quantum network," New J. Phys., 4:46 (2002).

Franson, J.D., "Bell inequality for Position and Time," Physical Review Letters, 62(19):2205-2208 (1989).

Gisin, N., et al., "Quantum cryptography and long distance Bell experiments: How to control decoherence,"Geneva, Switzerland, pp, 1-7 and 4 pages of drawings (Jan. 15, 1999).

Gisin, N., et al., "Quantum cryptography," Reviews of Modern Physics, 74:145-184 (2002).

Jennewein, T., et al., "Quantum Cryptography with Enlangled Photons," Physical Review Letters, 84(20):4729-4732 (2000).

Maurer, U., et al.,"Information-Theoretic Key Agreement: From Weak to Strong Secrecy for Free," Computer Science Department Swiss Federal Institute of Technology, 20 pages (2000).

Maurer, U.M., "Secret Key Agreement by Public Discussion From Common Information," IEEE Transactions on Information Theory, 39:733-742. (1993).

Mo, X., et al., "Intrinsic-Stabilization Uni-Directional Quantum Key Distribution Between Beijing and Tianjin," Key Lab of Quantum Information, Department of Electronic Engineering and Information Science, University of Science and Technology of China, Hefei, Anhul.

Naik, D.S., et al., "Entangled State Quantum Cryptography: Eavesdropping on the Ekert Protocol," Physical Review Letters, 84(20):4733-4736 (2000).

Ribordy, G., et al., "Long-distance entanglement-based quantum key distribution,"Physical Review A., vol. 63, 012309-1-012309-12 (2001).

Scarani, V., et al., "Quantum Cryptography Protocols Robust Against Photon Number Splitting Attacks for Weak Lazer Pulse Implementations," Physical Review Letters, 92(5):057901-1 through 057901-4 (Feb. 2004).

Scarani, V., et al., "Quantum cryptography protocols robust against photon number splitting attacks," ERATO Conference on Quantum Information Science 2003, Sep. 4-6, 2003, Niijimakaikan, Kyoto Japan; 2 pages.

Schneier, B., "Applied Cryptography," Second Edition, Chapter 10, Oct. 18, 1995, Wiley & Sons Publ., pp. 216-220.

Slutsky, B., et al., "Defense frontier analysis of quantum cryptographic systems," Applied Optics, 37(14):2869-2878 (1998).

Stucki, E., et al., "Quantum Key Distribution over 67 km with a plug&play system," New Journal of Physics, 41, 1-41, 8 (2002).

Tanzilli, S., et al., "PPLN waveguide for quantum communication," Eur. Phys. J.D., 18:155-160 (2002).

Tittel, W., et al., "Long-distance Bell-type tests using energy-time entangled photons," Physical Review A. 59(6):4150-4163 (1999).

Degermark, M., et al., "Small Forwarding Tables for Fast Routing Lookups," ACM, pp. 3-14 (1997).

Estrin, D., et al., "Security Issues in Policy Routing," IEEE, pp. 183-193 (1989).

Garcia-Luna-Aceves, J.J., et al., "Distributed, Scalable Routing Based on Vectors of Link States," IEEE Journal on Selected Areas in Communications, 13(8):1383-1395 (Oct. 1995).

Garcia-Lung-Aceves, J.J., et al. "Scalable Link-State Internet Routing," Network Protocols (Oct. 13-16, 1998).

Lakshman, T.V., et al., "High-Speed Policy-based Packet Forwarding Using Efficient Multi-dimensional Range Matching," Proceedings of the ACM SIGCOMM'98 conference on Applications, technologies, architectures and protocols for computer communication, pp. 203-214 (1998).

Lampson, B., et al., "IP Lookups Using Multiway and Multicolumn Search," IEEE/ACM Transactions on Newtworking, 7(3):324-334 (Jun. 1999).

Ramanathan, R., et al., "Hierarchically-organized, multihop mobile wireless Networks for quality-of-service support," Mobile Networks and Applications, 3:101-119 (1998).

Tsai, W.T., "An Adaptive Hierarchical Routing Protocol," IEEE Transactions on Computers, 38(8):1059-1075 (Aug. 1989).

Waldvogel, M., et al., "Scalable High Speed IP Routing Lookups," ACM, pp. 25-36 (1997).

Bowers, J.E. "Optical Network and Component Trends," UCSB, NSF Workshop, 51 pages.

Honjo, T., et al., "Differential-phase-shift Quantum Key Distribution," NTT Technical Review 2(12):26-23 (Dec. 2004).

Nambu, Y., et al., "BB84 Quantum Key Distribution System based on Silica-Based Planar Lightwave Circuits," Fundamental and Environmental Research Laboratories and Fiber Optic Devices Division, pp. 1-11.

Paniccia, M., "Silicon Integrated Photonics,"UCSB, 30 pages, Feb. 2, 2005.

Tomita, A., et al., "Recent Progress in Quantum Key Transmission," NEC J. of Adv. Tech., 2(1):84-91 (Winter 2005).

DeBashis Basak, Daniel O. Awduche, John Drake and Yakov Redhter, Multi-protocol Lambda Switching: Issues in Combining MPLS Traffic Engineering Control with Optical Cross-connects, IETF Internet Draft Memo, http://www.ietf.org/shadow.html, Feb. 2000, p. 1-9.

Daniel O. Awduche, Yakov Rekhter, John Drake and Rob Coltun, Multi-protocol Lambda Switching: Combining MPLS Traffic Engineering Control with Optical Crossconnects, IETF Internet Draft Memo, http://www.ietf.org/shadow.html, Jan. 2001 p. 21.

Charles H. Bennett and Gilles Brassard, Quantum Cryptography: Public Key Distribution and Coin Tossing, Intl. Conf. On Computer, Systems & Signal Processing, Bangalore, India, Dec. 10-12, 1984, 5 Pages.

Donald S. Bethune and William P. Risk, Prototype Autocompensating Quantum Cryptography System Based on Polarization Splitting of Light, Session QC41, DCOMP/CCP99: Quantum Computing and Cryptography, Mar. 24, 1999 (4 pages).

D.S. Bethune and W.P., Risk, An Autocompensating Fiber-Optic Quantum Cryptography System Based on Polarization Splitting of Light, IEEE Journal of Quantum Electronics, vol. XX, No. Y, 1999.

Graham P. Collins, Quantum Cryptography Defies Eavesdropping, Physics Today, Nov. 1992, p. 21-23.

L. Y. Lin, E.L. Goldstein and R.W. Tkach, Free-Space Micromachined Optical Switches for Optical Networking, IEEE Journal of Selected Topics in Quantum Electronics, vol. 5, No. 1, Jan./Feb. 1999.

S. Eisenberg and R. Boger, Kucent Technologies names Cherry Murray Physical Sciences Research Vice President, http://www.lucent.com/press/0300/000328.bla.html, Mar. 28, 2000 (2 Pages).

Simon J.D. Phoenix, Stephen M. Barnett, Paul D. Townsend and K.J. Blow, Multi-user Quantum Cryptography on Optical Networks, Journal of Modern Optics Letter, vol. 42, No. 6, 1995, pp. 1155-1163.

Laser End-Point Detection System, IBM Technical Disclosure Bulletin, vol. 28, No. 7, Dec. 1985, pp. 3151-3163.

E. Rosen, A Viswanathan and R. Callon, Multiprotocol Label Switching Architecture, Internet Standards Track Protocol, Internet Official Protocol Standards (STD 1), Jan. 2001, pp. 1-61.

P.D. Townsend, J.G. Rarity and P.R. Tapster, Enchanced Single Photon Fringe Visibility in a 10 km-Long Prototype Quantum Cryptography Channel, Electronics Letters, vol. 29, No. 14, Jul. 8, 1993, pp. 1291-1293.

P.D. Townsend, Secure Key Distribution System Based on quantum Cryptography, Electronics Letters, vol. 30, No. 10, May 12, 1994, pp. 809-811.

P.D. Townsend, J.G. Rarity and P.R. Tapster, Single Photon Interference in 10km Long Optical Fiber Interferometer, Electronics Letters, vol. 29, No. 7, Apr. 1, 1993, p. 634-635.

James A. Walker, Telecommunications Applications of MEMS, mstnews, Mar. 2000, p. 6-9.

Office action issued on Sep. 06, 2007 for U.S. Appl. No. 10/803509.

Office action issued on Jul. 10, 2007 for U.S. Appl. No. 10/795313.

Office action issued on May 25, 2007 for U.S. Appl. No. 10/218652.

Office sction issued on Sep. 26, 2007 for U.S. Appl. No. 10/716,078.

Awduche, D., et al., Multi-protocol Lambda Switching: Combining MPLS Traffic Engineering Control with Optical Cross-connects, IETF Internet Draft Memo, http://www.jetf.org/shadow.html, Jan. 2001, p. 21.

Basak, D. et al., "Multi-protocol Lambda Switching: Issues in Combining MPLS Traffic Engineering Control with Optical Cross-connects," IETF Internet Draft Memop, http://jetf.org/shadw.html, Feb. 2000, pp. 1-9.

Bennett, C., et al., "Quantum Cryptography: Public Key Distribution and Coin Tossing," Intl. Conf. on Computers, Systems and Signal Processing, Bangalore, India, Dec. 10-12, 1984, 5 pages.

Bethune, D.S., et al., An Autocompensating Fiber-Optic Quantum Cryptography System Based on Plarization Splitting of Light, IEEE Journal of Auantum Electronics, 36(3):340-347 2000.

Bethune, D.S., et al., "Prototype Autocompensating Quantum Cryptography System based on Polarization Splitting of Light," Session QC41, CCOMP/CCP99: Quantum Computing and Cryptography, Mar. 24, 1999, 4 pages.

Cabello, A., "Multiparty key distribution and secret sharing based on entanglement swapping," pp. 1-8, 2000.

Collins, g. "Quantum Cryptography Defies Eavesdropping," Physics Today, pp. 21-23, 1992.

Crepeau, C., et al., "Secure Multi-part Quantum Computation," ACM, pp. 1-10, 2001.

Eisenberg et al., Lucent Technologies names Cherry Murray Physical Sciences Research Vice President, http://www.lucent.com/press/0300/000328.bla.html, Mar. 28, 2000, 2 pages.

Franson, "Violations of a New Inequality for Classical Fields," Johns Hopkins University, NTIS NASA publication, Goddard Space Flight Center, Workshop on Squeezed States and Uncertainty Relation, pp. 23-32, 1992.

Gisin, N., "Quantum Cryptography on Noisy Channels: Quantum versus Classical Key-Agreement Protocols," The American Physical Society, pp. 4200-4203, 1999.

Gottesman, D., et al., "Secure quantum key distribution using squeezed states," pp. 1-19, 2000.

"User End-Point Detection System", IBM Technical Disclosure Bulletin, 28(7):3151-3163, 1985.

Lin, L.Y. et al., "Free-Space Micromachined Optical Switches for Optical Networking," IEEE Journal of Selected Topics in Quantum Electronics, vol. 5, No. 1, 1999.

Liu, S., et al., "A Practical Protocol For Advantage Distillation and Information Reconciliation," Kluwer Academic Publishers, pp. 36-62, 2003.

Maurer, U.M., et al., "Unconditionally Secure Key Agreement and The Intrinsic Conditional Information," IEEE Transactiona on Information Theory, vol. 45, No. 2, pp. 499-514, 1999.

Phoenix et al, "Multi-User Quantum Cryptography on Optical Networks," Journal of Modern Optics, 42(6):1155-1163, 1995.

"Quantum Public Key Distribution System," IBM Technical Disclosure Bulletin, 28(7):3153-3163, 1985.

Rosen et al., "Multiprotocol Label switching Architecture, Internet Standards Track Protocol," Internet Official Protocol Standards (STD 1), pp. 1-61, 2001.

Townsend et al, "Enhanced Single Photon Fringe Visability in a 10 km Long Prototype Quantum Cryptography Channel," Electronics Letters, 29(14):1291-1293 (1993).

Townsend et al., "Secure Key Distribution System Based on Quantum Cryptography," Electronics Letters, 30(10):809-811, 1994.

Townsend et al., "Single Photon Interference in 10 km Long Optical Fibre Interferometer," Electronics Letters, 29(7):834-835, 1993.

Walker, James Telecommunications Applications of MEMS, mstnews, pp. 6-9, 2000.

Zhang, Xian-Mo and Zhen, Yuliang, "Cryptographically Resilient Functions," IEEE Transactions on Information Theory, vol. 43, No. 5, pp. 1740-1747, 1997. Found at: http://ieeexplore.ieee.org/iel3/18/13537/00623184.pdf?tp=&arnumber=623184&isnumber=13517.

* cited by examiner

QUANTUM CRYPTOGRAPHIC KEY DISTRIBUTION NETWORKS WITH UNTRUSTED SWITCHES

CROSS-REFERENCE TO RELATED APPLICATIONS

The instant patent application claims the benefit of U.S. Provisional Patent Application Ser. No. 60/242,597, filed Oct. 23, 2000, which is hereby incorporated by referenced in its entirety. The instant patent application is related to co-pending U.S. patent application Ser. No. 09/943,709, entitled "SYSTEMS AND METHODS FOR PATH SET-UP IN A QUANTUM KEY DISTRIBUTION NETWORK," filed on even date herewith, having assignee in common with that of the instant patent application, which is incorporated herein by reference in its entirety.

FIELD OF THE INVENTION

The present invention relates to methods and systems for using the principles of quantum mechanics to distribute a random cryptographic key over an insecure network using untrusted switches.

DESCRIPTION OF RELATED ART

Cryptography is the science of securing information by rendering it unreadable to everyone except the intended recipient of the information. Cryptography also provides a mechanism to ensure that a message is authentic and unmodified. Information that has been cryptographically rendered unreadable may be described as "encrypted," and conversely, unreadable information that is unscrambled and again rendered into readable form may be described as "decrypted." The process of encrypting and decrypting information using traditional cryptographic methods employs at least one piece of information commonly called a "key" because it is used to "unlock" an encrypted message. Cryptography has traditionally been of great importance to persons seeking to communicate secretly. Applications of cryptography range from the protection of private records to secure payment systems.

Symmetric cryptography describes a system of encrypting and decrypting information using the same key to perform both encryption and decryption. There are numerous symmetric cryptographic methods, having various characteristics including relative strength, speed of computation, and convenience. The one-time pad offers security that is considered to be unbreakable. However, all symmetric cryptographic methods share a common problem, namely the need to privately and securely exchange information about the symmetric key.

Secure key exchange methods are used to exchange cryptographic keys. A traditional solution to this problem is to physically deliver the key via a secure courier. Another method is to use public key cryptography to exchange a symmetric key. Methods of public key cryptography are well known. Yet another method for securely exchanging keys is quantum cryptography.

Quantum cryptography is a technique for the private and secure distribution of a key for use in subsequent encryption and decryption. Quantum cryptography is built upon the principles of quantum mechanics, according to which there is statistical uncertainty regarding the properties of a photon. Furthermore, principles of quantum mechanics require that the act of observing a series of randomly oriented photons necessarily will affect some of the observed photons. This principle is used in quantum cryptography to securely exchange keys, because in observing the states of the transmitted photons, an eavesdropper will detectably corrupt the states of the transmitted photons.

In the field of quantum cryptography, there has been significant research, resulting in a number of publications and issued patents. In a well-known publication by Charles H. Bennett and Gilles Brassard, entitled "Quantum Cryptography: Public Key Distribution and Coin Tossing", International Conference on Computers, Systems & Signal Processing, Bangalore, India (1984), Bennett and Brassard describe a quantum-cryptographic system in which a random key is transmitted using photons having random orientations. A receiver observes the photons with a randomly oriented basis, recording the orientations of the receiver basis and the observed photons. In a separate public channel that may be subject to passive eavesdropping, the sender and receiver then compare and discard a random subset of the transmitted bits to determine whether there had been significant errors or eavesdropping in the quantum channel. If the sender and receiver determine that a sufficiently small number of the compared bits were wrong, the remaining bits are used as key information for conducting encrypted communications on the public channel. The Bennett and Brassard system can withstand passive eavesdropping, i.e. listening in the public channel, but it cannot tolerate active eavesdropping, i.e. man-in-the middle attacks in the public channel.

Other research has resulted in more efficient methods of performing quantum-cryptographic ("QC") key exchange. For example, U.S. Pat. No. 5,732,139 to Lo et al. ("Lo") describes an improved system relating to the selection of probabilities of the states of transmitted photons, resulting in a reduced quantity of discarded data. However, Lo does not suggest a way to perform QC key exchange using untrusted networking switches.

These publications illustrate various techniques for using quantum cryptography, but they also illustrate one of its main shortcomings. Quantum cryptography is primarily a point-to-point key distribution technique, and when an intermediate piece of networking equipment such as a switch is introduced into a quantum cryptography path, the operator of the networking equipment can undetectably break the security of the key exchange. Therefore, all known systems employing quantum cryptography require the use of trusted switches. However, in practical networking environments, it is not economically feasible to have physical control of all components in a network. In practice, parts of a network may be controlled by enemies or competitors. Therefore, there is a need in the art for a system for securely employing quantum cryptography over a network including untrusted switches.

QC key distribution uses individual photons to convey keying information between two devices. In conventional QC techniques, these two devices are directly connected by an optical path, either via directly attached fiber that runs between the devices, or by free-space optical paths. In essence, one device sends a stream of individual photons directly from itself to another device. Then various protocols are used in order to agree on the quantum state conveyed via these photons and hence to agree on shared keying data. A very high degree of protection is provided by quantum cryptography—in essence, QC key distribution techniques make it impossible for an eavesdropper to gain information about the exchanged cryptographic key without being detected.

Conventional QC technology has the severe drawback, however, that it is a point-to-point key distribution technique. Therefore, known systems require intervening network devices to be brought into the same trust domain as the endpoint devices, meaning that the network devices must participate in and understand the key distribution process. This is undesirable in many ways, as systems are generally much more secure when users can employ encryption techniques that do not require trusted active participation of additional entities.

Micro-Electro-Mechanical Systems ("MEMS") comprising mirror arrays are used to perform optical switching in an optical networking environment. This technology is described in U.S. Pat. No. 5,960,133 to Tomlinson ("Tomlinson"), entitled "Wavelength-Selectable Optical Add-Drop using Tilting Micro-Mirrors." Tomlinson further identifies publications disclosing the necessary technology for fabricating such devices, but Tomlinson fails to suggest the use of such technology in a system for performing quantum cryptographic key exchange.

Other publications have suggested that MEMS technology is ripe for use in telecommunications applications. See e.g. J. A. Walker, "Telecommunications Aspects of MEMS," International Newsletter on Microsystems and MEMS, No. 3/00, June 2000, pp. 6-9. In this article, Walker describes several applications of MEMS in optical fiber telecommunications systems, including optical cross-connects ("OXC") and the Lucent™ WaveStar™ Lambda Router, however, he does not suggest that MEMS technology be combined with quantum cryptography.

In addition to MEMS mirror arrays, there are other means of redirecting optical energy. U.S. Pat. No. 5,960,131 to Foquet et al describes a switching mechanism for selectively connecting a first optical path to a second optical path through an index-matching fluid. U.S. Pat. No. 6,005,993 to Robert I. McDonald discloses an optical switch that uses prisms to deflect and reflect optical energy so as to switch optical energy from input ports to output ports. U.S. Pat. No. 6,154,586 to Robert I. McDonald et al. describes a switch mechanism having a block made of a light transmissive substrate containing a cavity that is divided by a light transmissive diaphragm into a reflective portion and a transmissive portion. U.S. Pat. No. 5,911,018 discloses an optical switch element that uses wave-guide segments to switch optical energy from an input port to an output port. U.S. Pat. Nos. 5,960,131, 6,005,993, 6,154,586, and 5,911,018 are incorporated herein by reference.

Multi-Protocol Lambda Switching ("MPL(ambda)S") is an optical networking technology using Multi-Protocol Label Switching ("MPLS") to provision OXCs. This work is being standardized in the Internet Engineering Task Force ("IETF"). See the IETF Draft entitled, "Multi-Protocol Lambda Switching: Combining MPLS Traffic Engineering Control With Optical Crossconnects," by D. Awduche et al. (January 2001). Additional MPLS background is provided in "MPLS: Technology and Applications", by Bruce S. Davie and Yakov Rekhter, Morgan Kaufman Publishers (2000).

Communications network technology is very widely known to those of ordinary skill in the art. It is evident to those skilled in the art that traditional networking technology would be greatly enhanced and benefited by a system for using quantum cryptography on untrusted switches.

SUMMARY OF THE INVENTION

Consistent with the present invention, methods and systems are provided by which a number of quantum-cryptographic endpoints, such as, for example, computers and firewalls, can be placed into a shared key distribution network and can exchange QC photons across a network without the network switches being able to read or alter the photons. The present invention provides the benefits of a shared key distribution network without requiring trusted switches.

In accordance with the present invention, methods and systems for securely transmitting information in a network comprising untrusted network components are provided. The methods and systems send at least one setup message to a networking device. Based on the setup message, the methods and systems configure at least one mirror device to direct polarized light along a path to a terminal endpoint, whereby a configured path is established. The methods and systems send a stream of bits using a plurality of polarized light pulses along the configured path, the pulses having a first set of randomly selected polarization bases. The methods and systems involve measuring the polarization of the polarized light pulses using a second set of randomly selected polarization bases.

Additional benefits of the present invention will be set forth in part in the description, which follows, and in part will be obvious from the description, or may be learned by practice of the present invention. The benefits of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments consistent with the present invention and together with the description, serve to explain the principles of the present invention. In the drawings.

DETAILED DESCRIPTION

Network Description

Figure 1:
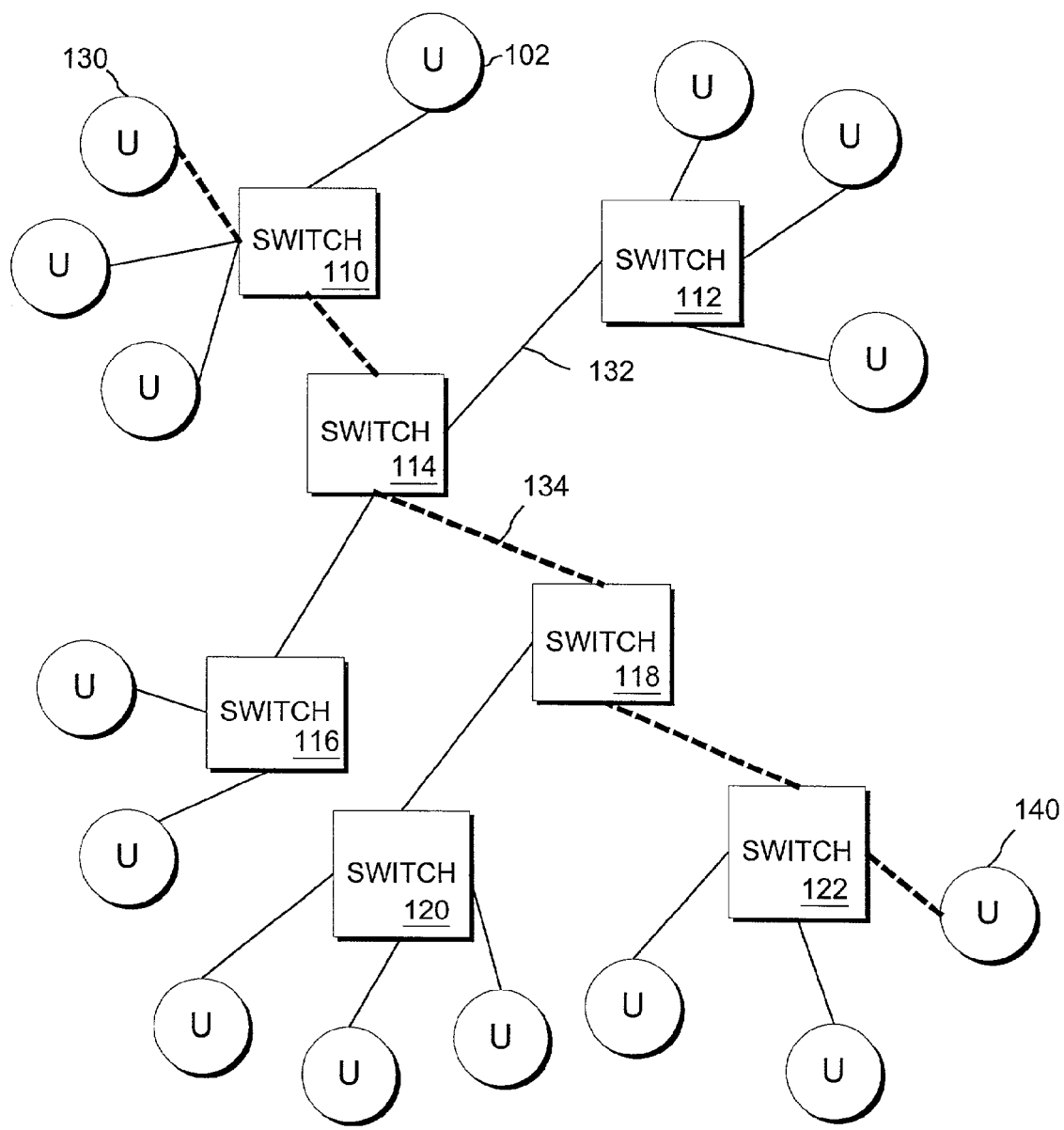
FIG. 1 is block diagram illustrating a network in which systems consistent with the present invention may operate.

The present invention provides a highly secure key-distribution system within a potentially insecure optical-fiber network, using untrusted switches to form secure links, based on the principles of quantum cryptography. An untrusted switch is a switch that is operated by or accessible to a party that may attempt to eavesdrop on or intercept network communications. The untrusted switches are unable to read or alter the contents of any communication between endpoint devices because the switches passively redirect light from one fiber strand to another using OXC or other technology for redirecting optical energy. QC principles prevent undetected eavesdropping in the optical channel.

This is an extremely useful result as it provides a highly secure key-distribution infrastructure that can be employed by one organization using fiber optics maintained by another organization. For example, a network within a classified government facility could securely convey cryptographic key data for several different "compartments" of traffic. Each compartment would be strictly isolated from each other and from the underlying switching infrastructure. As another example, a metropolitan area network, using technology consistent with the present invention, could act as the key distribution infrastructure for a number of competing companies while protecting the confidential business information in each company. Each company would be able to securely distribute keys over the shared optical-fiber network without concern that the company's cryptographic keys were being intercepted, monitored, or altered by another entity using the same metropolitan network.

In accordance with the present invention, endpoint devices send and receive single photons or light pulses having characteristics similar to single photons. The endpoints use these photons to convey keying information. In one embodiment, the switches employ MEMS technology to provide a set of reflective devices that reflect the photons from an origin endpoint to a terminal endpoint, possibly passing through multiple switches, consistent with the present invention. Alternatively, instead of MEMS reflectors, the switches may employ other reflective devices, such as for example conventional mirrors, optics, photonic-bandgap material, and other known optical switching devices. Because these reflective devices are passive reflectors, they cannot read or alter the photons' quantum state. Hence the switches are not part of the trust domain; the photons are created and observed only at endpoint devices, and if a switch attempts to observe the photons, the observation will be detected, consistent with known QC principles.

Networking technology exists that is capable of realizing switches, consistent with the present invention. In fact, production optical switching networks that use OXC are beginning to be deployed. Systems and methods consistent with the present invention leverage this new field of commercial technology to provide new systems for quantum cryptographic key distribution.

FIG. 1 is block diagram illustrating a network in which systems consistent with the present invention may operate. Switches, such as switches 110, 112, 114, 116, 118, 120, and 122 are illustrative untrusted switches within the network of FIG. 1. User endpoints are represented by the circular endpoints 102, 130, and 140. These endpoints are representative of individual computer systems such as personal computers, web servers or other computer systems that need to privately exchange cryptographic key data. Endpoints 120, 130, and 140 may be also representative of logical network-demarcation points, such as for example, firewalls. In FIG. 1, solid lines, such as network connection 132 represent optical fiber connections that may be used for quantum cryptographic key distribution. The dotted lines, such as network connection 134 represent a specific path taken by a stream of photons, from endpoint 130 to endpoint 140. This path passes through a series of intermediate untrusted switches, in this case switches 110, 114, 118, and 122. The path through these untrusted switches forms a QC key distribution path between endpoints 130 and 140.

In FIG. 1, multiple switches are shown, however, in another embodiment, consistent with the present invention, key information may be securely exchanged over a simpler network in which a number of endpoints are directly connected to a single switch, forming a star topology. In this embodiment, a number of computers in a single building form highly secure associations between pairs of computers so that only the particular computers involved in a chosen association participate in a secure communication session.

Figure 2:
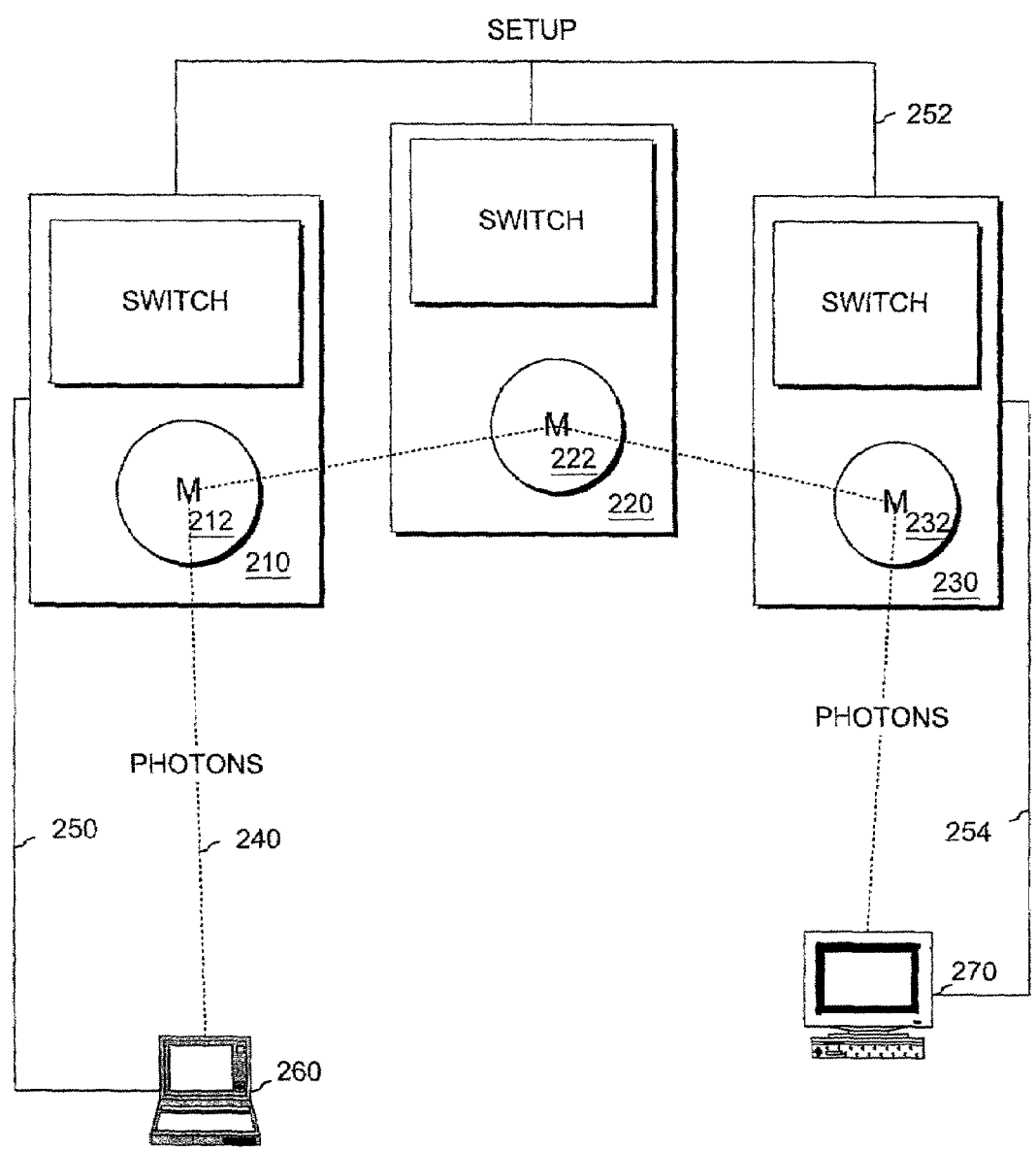
FIG. 2 is a block diagram illustrating a key distribution path consistent with the present invention, the path passing through a network of untrusted switches.

FIG. 2 is a block diagram illustrating a key distribution path consistent with the present invention, the path passing through a network of untrusted switches. In one embodiment, computers 260 and 270 are equipped with a quantum cryptographic key distribution interface as used in quantum cryptography. Three switches are also shown, namely switches 210, 220 and 230. In this embodiment, quantum photons are sent from computer 260 through switches 210, 220, and 230 to computer system 270. Along this path, photons are directed by MEMS mirror arrays 212, 222, and 232, in switches 210, 220, and 230 respectively. Thus individual photons travel from endpoint computer 260 to endpoint computer 270 without being inspected, altered, amplified, or regenerated in any way by switches 210, 220, and 230.

In an embodiment, consistent with the present invention, a path through a quantum cryptographic network is established by properly arranging optical switching devices, such as, for example, mirrors in MEMS arrays, so that photons travel from computer 260 to computer 270. The mirror arrangement process is coordinated by a series of control or setup messages that travel along setup network connections 250, 252, and 254. The setup messages are sent using known protocols such as, for example, the Constraint-based Routing Label Distribution Protocol ("CR-LDP") or the Resource Reservation Protocol ("RSVP"). The messages are exchanged between endpoint devices via intermediate network switches. The setup messages contain information necessary to adjust the optical switching device configuration, producing path 240, along which photons can travel. Thus established, path 240 becomes a trusted path through untrusted network devices. Not shown in FIG. 2 is a separate, conventional network path, which is used for the transmission of data messages and for the public portion of QC key distribution. The conventional path may be implemented using known means, such as, for example, IP datagrams, ATM, or SONET. Consistent with the present invention, quantum cryptographic methods are used to exchange key information over the QC fibers, after which secure communication can proceed using known cryptographic methods on the conventional network.

Figure 3A:
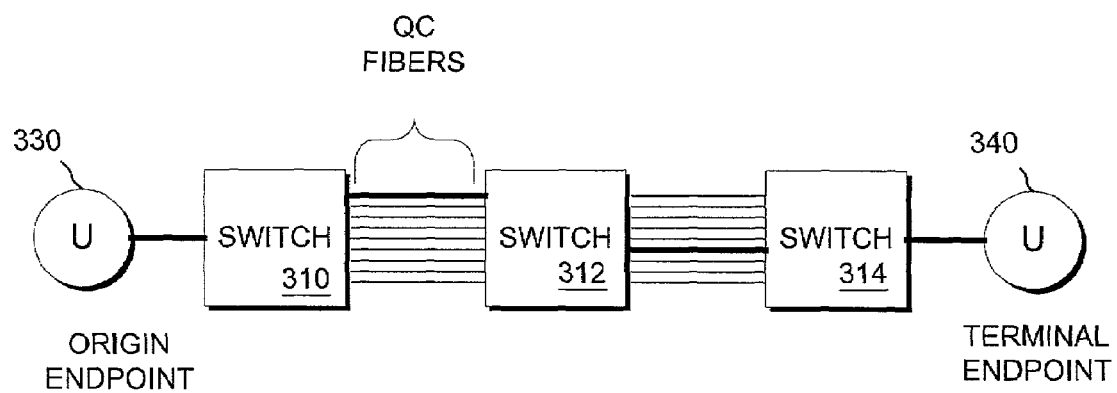
FIG. 3A is a block diagram illustrating an optical-fiber network path consistent with the present invention through a network, including networking switches.

FIG. 3A is a block diagram illustrating an optical-fiber network path consistent with the present invention through a network, including networking switches. The switches are interconnected via a number of parallel optical fibers, e.g. as deployed in conventional fiber cables which often have 48 or more fibers in a single cable. The pathway between origin endpoint 330 and terminal endpoint 340 is set up along unused fibers throughout path so that each QC photon travels along a dedicated set of fibers. An individual fiber is allocated to a single QC key exchange session. Switches 310, 312, and 314 determine a path from origin endpoint 330 to terminal endpoint 340, using currently unused fibers. This function is very similar to known methods of establishing paths, using protocols such as MLPLS and MPL(ambda)S. Therefore routing and path setup techniques can be borrowed from those proven technologies, as will be appreciated by those of ordinary skill in the art.

Each QC photon emerges from an inbound fiber into a switch, and the switch redirects the photon using an optical switching device, such as, for example, a small mirror that is precisely angled so as to direct the photon into a predetermined outbound fiber. In this way, individual QC photons travel through the network from origin endpoint 330 to terminal endpoint 340.

Figure 3B:
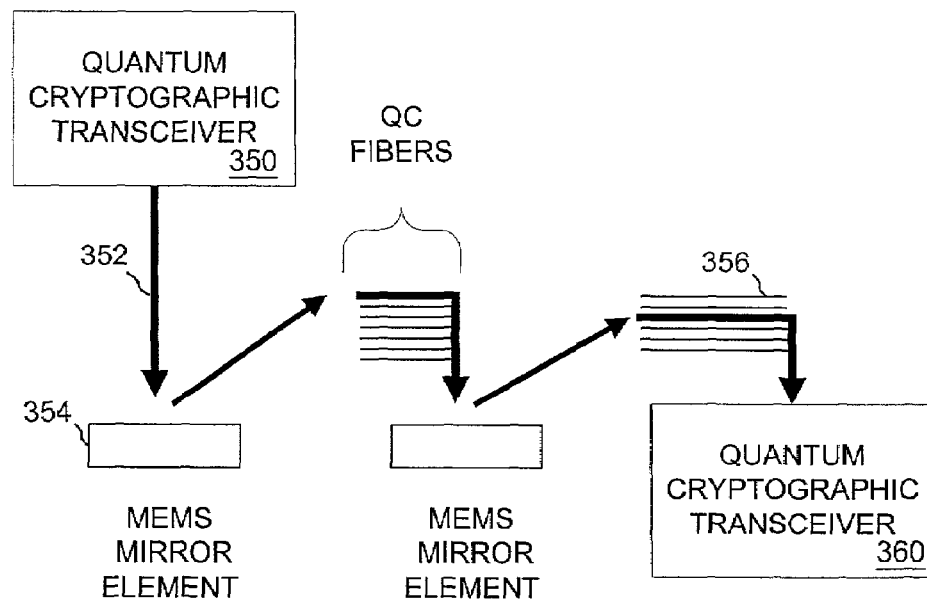
FIG. 3B is a block diagram illustrating a quantum cryptographic key exchange consistent with the present invention in a network using micro-electro-mechanical systems.

FIG. 3B is a block diagram illustrating a quantum cryptographic key exchange consistent with the present invention in a network using MEMS. In this embodiment, quantum cryptographic transceiver 350 transmits a QC photon over link 352. MEMS mirror element 354 directs the QC photon through a path along an optical fiber network terminating via link 356 at quantum cryptographic transceiver 360.

Figure 4:
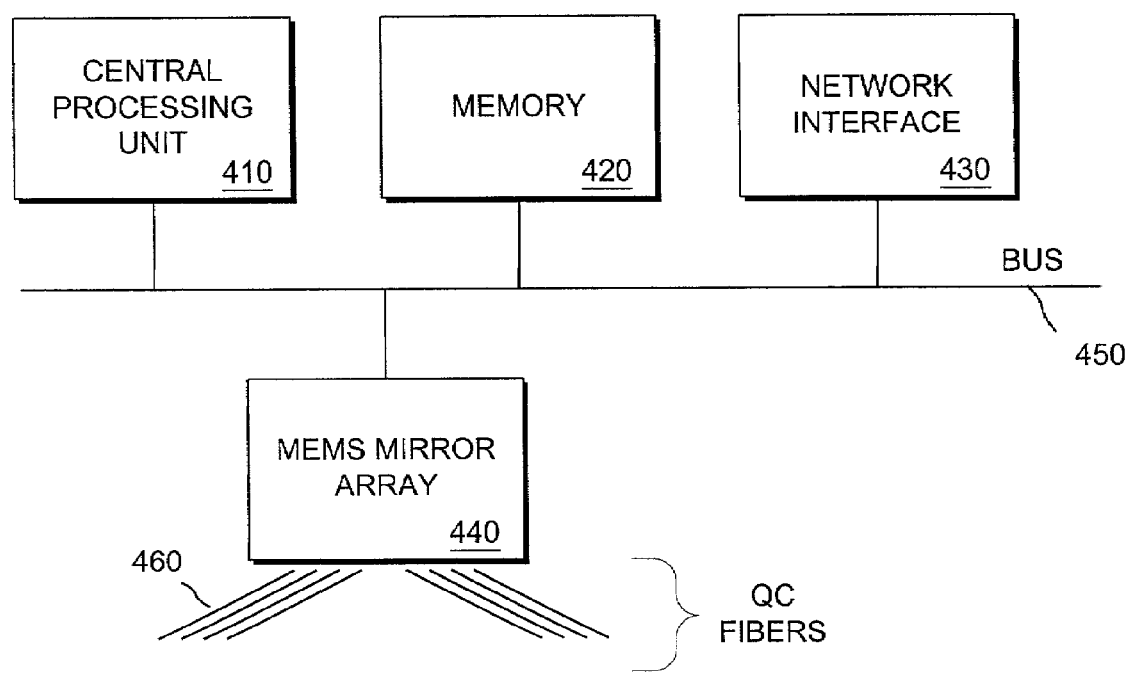
FIG. 4 is a block diagram illustrating a networking switch consistent with the present invention.

FIG. 4 is a block diagram illustrating a networking switch consistent with the present invention. The switch is controlled by central processing unit ("CPU") 410. CPU 410 may be one of the commercially available microprocessors or microcontrollers, such as, for example the MC68302 from Motorola Inc. Memory 420 is used to store the instructions for causing CPU 410 to perform methods consistent with the present invention. Memory 420 may also include buffer space used to store state variables used in performing such methods. Memory 420 may be implemented using RAM, ROM, EEPROM, Flash EEPROM and equivalent devices. Network interface 430 is used to connect the switch to a conventional network for the exchange of setup and configuration information within the network. MEMS mirror array 440 is connected to bus 450 that interconnects array 440 with CPU 410, memory 420, and network interface 430.

Path Formation

In order to facilitate the secure exchange of cryptographic key data over QC networks, consistent with the present invention, a QC path must be formed between an origin endpoint and a terminal endpoint. The present invention relies on the use of a circuit-switched network, and the operation of circuit-switched networks involves several processes, including: circuit setup, communication, and circuit teardown. Methods and systems consistent with the present invention use known circuit-switching techniques to provide a new way to perform QC key exchange via untrusted switches, and, since circuit-switching operations are known, general circuit operations will not be described in great detail.

Figure 5:
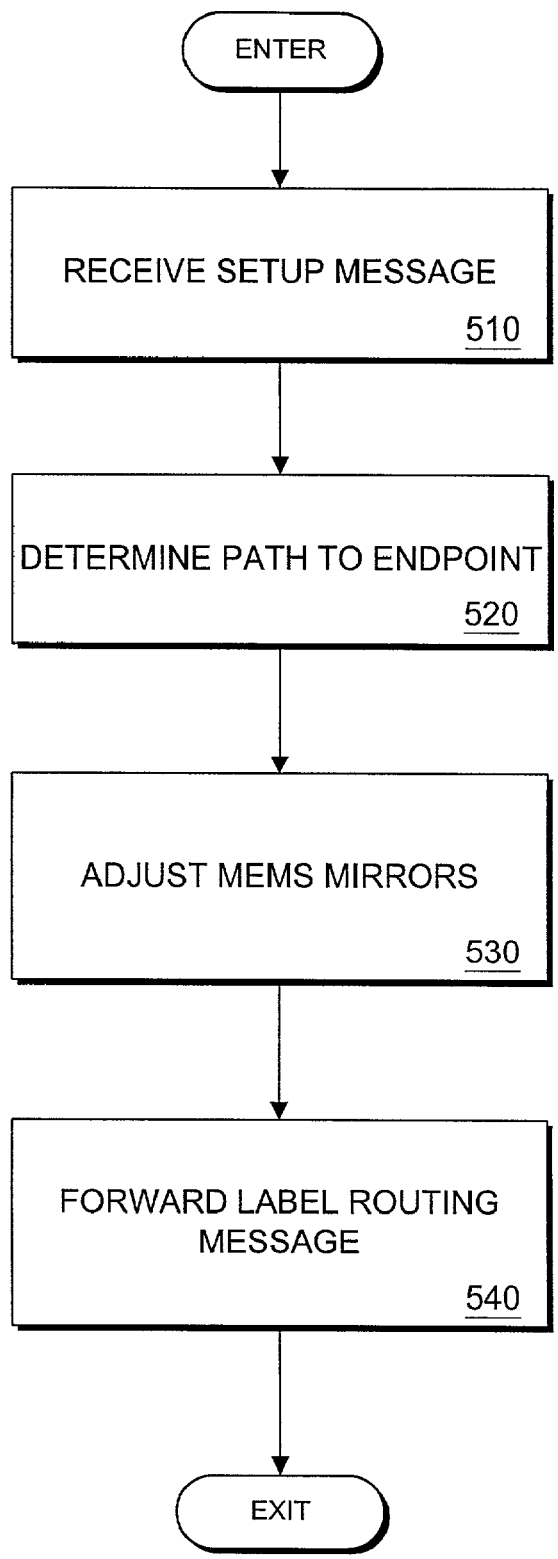
FIG. 5 is a flow diagram illustrating steps performed by an ingress switch consistent with the present invention.

FIG. 5 is a flow diagram illustrating steps performed by an ingress switch consistent with the present invention. An ingress switch is the switch into which a QC photon enters a switched network. On a conventional public network, the ingress switch receives a setup message from an originating endpoint computer (step 510). Next, the ingress switch uses known methods to determine a path to the terminal endpoint (step 520). In one embodiment, the switch accesses records in an internal network topology database to determine a complete path to the terminal endpoint, i.e., a path that has unused fiber segments for the entire path to the terminal switch. In this embodiment, the switch makes an internal record in its memory of which outbound fiber segment it will use for the current QC connection. In other embodiments individual switches do not maintain complete path information, instead relying on the routing techniques inherent in a protocol, such as, for example, label switching.

Next, the switch adjusts its internal optical switching devices to passively redirect incoming photons from the originating endpoint computer to a fiber strand that forms a path to the next device in the network (step 530). Finally, on the conventional network, the switch forwards to the next device in the network path an intermediate setup message, such as for example, a label routing message (step 540). In one embodiment, the setup message is augmented with information on a complete source route from the ingress switch to the terminal endpoint, i.e., a list of all switches that must be traversed.

Figure 6:
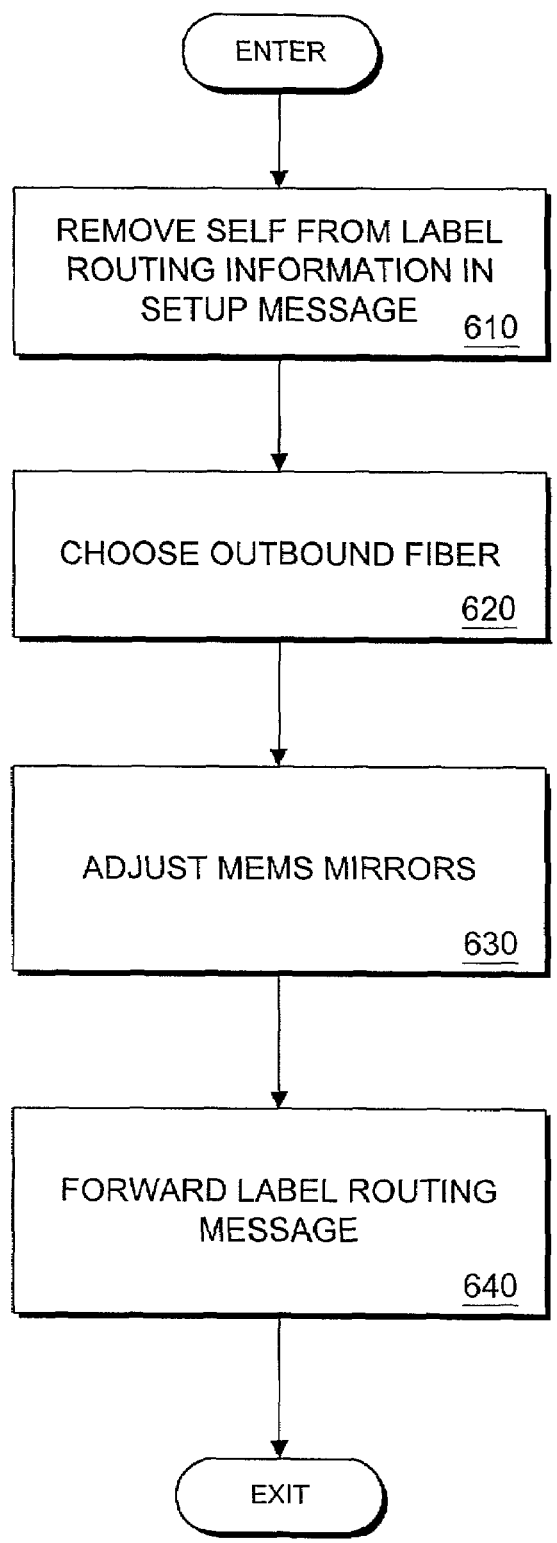
FIG. 6 is a flow diagram illustrating steps performed by an intermediate switch in a network consistent with the present invention.

FIG. 6 is a flow diagram illustrating steps performed by an intermediate switch (e.g. switch 114 or switch 118 of FIG. 1) in a network consistent with the present invention. An intermediate switch receives a setup message from an upstream neighbor switch in the network and removes itself from the label routing information within the setup message (step 610). Next, the intermediate switch chooses an outbound fiber based on information obtained from the setup message (step 620). In one embodiment, the intermediate switch makes an internal record regarding the outbound fiber segment it selected for the outbound connection. Next, the intermediate switch adjusts its optical switching device so that photons from the incoming fiber are directed into the newly allocated outbound fiber segment (stop 630). Next, the intermediate switch sends the revised setup message to the next downstream switch (possibly another intermediate switch) or to the terminal endpoint, if the intermediate switch is an egress switch (step 640).

Figure 7:
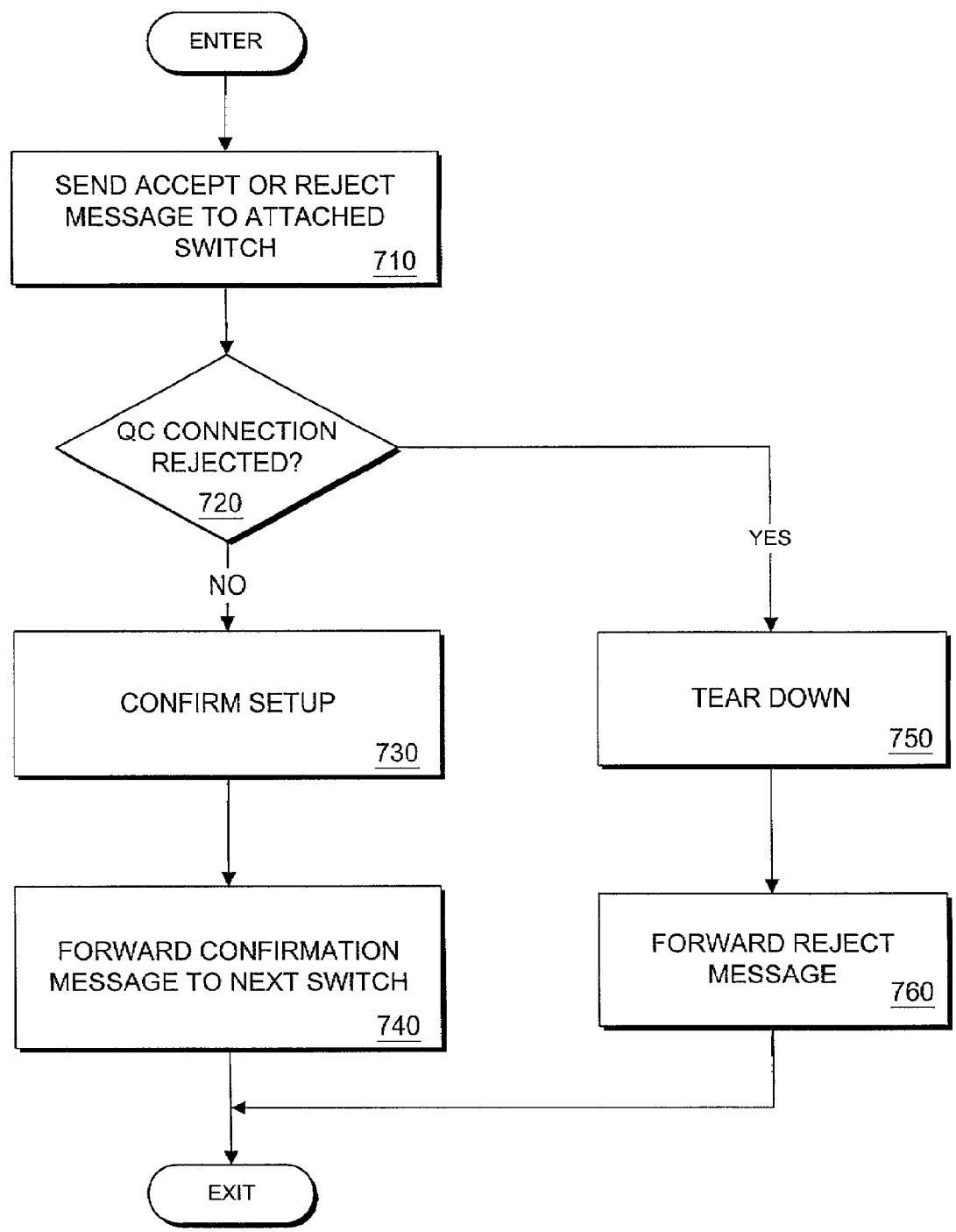
FIG. 7 is a flow diagram illustrating steps performed by networking devices in a setup phase consistent with the present invention.

FIG. 7 is a flow diagram illustrating steps performed by networking devices in a setup phase consistent with the present invention. Once a complete set of setup messages have traversed the path of network switches to the terminal endpoint, the terminal endpoint device prepares to accept QC photons from the origin endpoint device. The terminal endpoint device sends an accept or reject message along the reverse path of the connection setup (step 710). And each switch along the path inspects the accept or reject message. If the message is a reject message (step 720), then a circuit teardown operation begins (step 750), as further described in connection with FIG. 8. After the teardown operation is completed, the switch forwards the reject message to the next upstream switch (step 760). If, however, the terminal endpoint sent an accept message, the receiving switch confirms that its optical switching device is properly set up (step 730). Finally, the receiving switch forwards the confirmation message to the next upstream switch or to the origin endpoint if the receiving switch is the ingress switch (step 740).

Quantum-Cryptographic Communication

Next the origin and terminal endpoints exchange cryptographic key information using known QC techniques, such as described above and in U.S. Pat. No. 5,764,765 to Phoenix et al., which is incorporated herein by reference. During this phase the endpoint devices may be oblivious to the fact that the photons used in these operations are bouncing along a series of mirrors and traveling through fiber segments in traversing the path from origin endpoint to the terminal endpoint.

Sending and receiving photons over network paths, consistent with the present invention, may be performed using available telecommunications equipment. For example, D. S. Bethune and W. P. Risk describe systems for sending and receiving QC signals in "An Autocompensating Fiber-Optic Quantum Cryptography System Based on Polarization Splitting of Light," IEEE Journal of Quantum Mechanics, Volume 36, Number 3, March 2000, at. 340, which is incorporated herein by reference. Bethune and Risk explain that single photons having wavelengths of 1.31 and 1.55 μm can be detected using Ge or InGaAs avalanche photodiodes ("APD"), such as, for example, Fujitsu™ FPD5W1KS InGaAs APD's. Consistent with the present invention, polarized light pulses may be generated using standard telecommunications lasers and standard polarizing beam splitters. One embodiment consistent with the present invention uses the above technology disclosed by Bethune and Risk, however, the invention is not limited to these devices, and equivalents may be employed and substitutions made without departing from the scope of the present invention as recited in the claims. For example, instead of polarization states of photons, the relative phase between two amplitude packets, produced by splitting each light pulse and delaying one portion before sending it, may be used to communicate a stream of bits for QC key distribution.

Quantum-Cryntographic Link Teardown Phase

Figure 8:
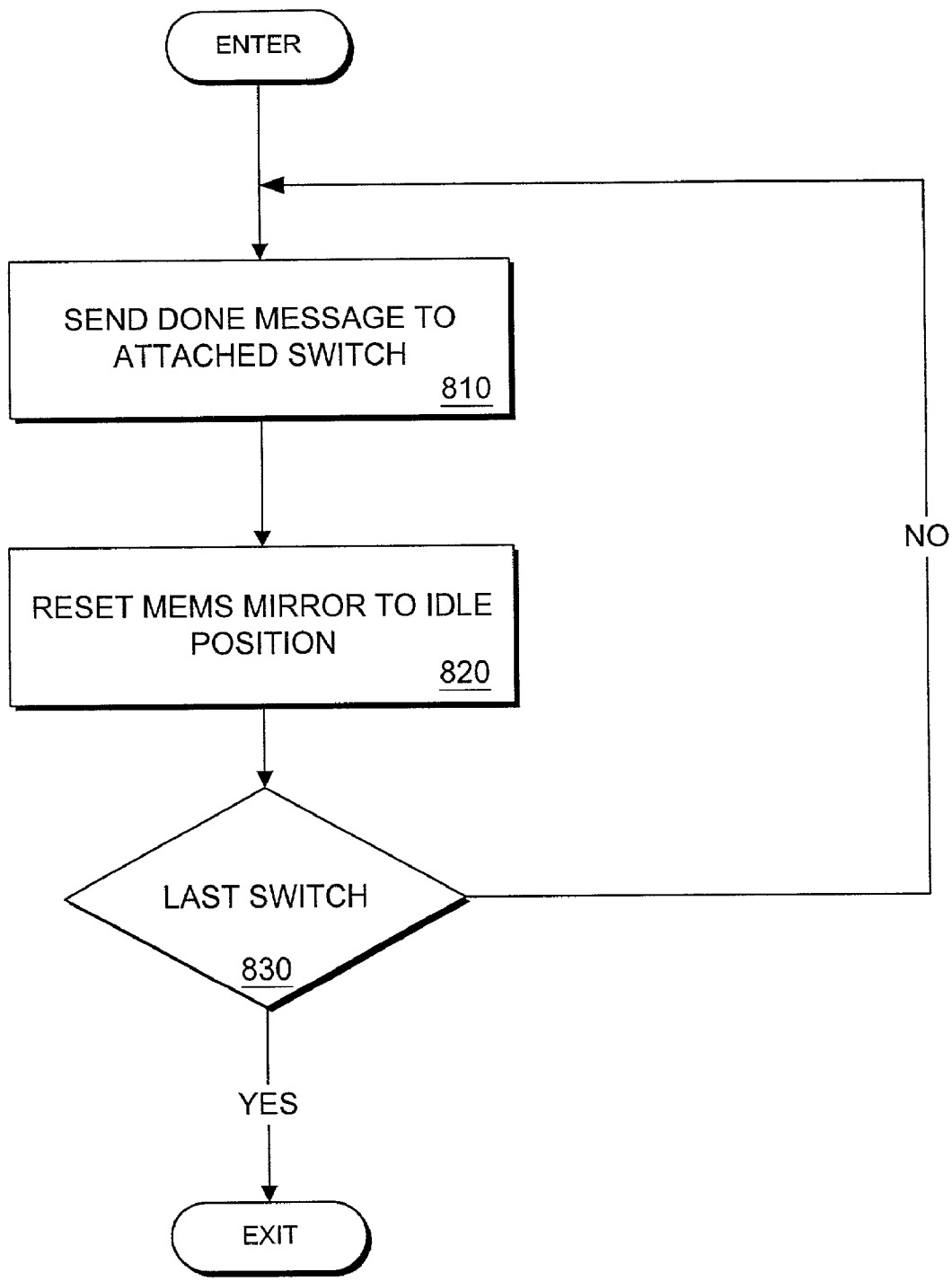
FIG. 8 is a flow diagram illustrating steps performed by networking devices in a circuit-tear-down phase consistent with the present invention.

FIG. 8 is a flow diagram illustrating the steps performed by networking devices in a circuit-tear-down phase consistent with the present invention. Upon completion of key exchange, or when either endpoint device chooses to terminate the QC connection, link teardown proceeds as follows. The terminating endpoint composes a "DONE" message and sends the message to its attached switch (step 810). The attached switch resets the associated MEMS mirror for this connection to an idle position (step 820). In one embodiment, the switch marks the associated outbound fiber segment as unused in its internal database. Next, the switch determines if it is the last switch in the path (step 830), and if it is the last switch, the method terminates, otherwise, the method continues at step 810.

Since there are known methods for establishing circuits in a network, it is not necessary to further explain the process by which switches, consistent with the present invention, communicate setup information regarding free and in-use fiber segments within the network. For example, circuit switching techniques consistent with the present invention are similar to the techniques used in MPLS for finding free capacity for new traffic circuits, to those used in MPL(ambda)S for finding free wavelengths across Dense Wavelength Division Multiplexing ("DWDM") networks, and to those used for routing in Asynchronous Transfer Mode ("ATM") networks. As such, the CR-LDP or Private Network-to-Network Interface ("PNNI") protocols provide the necessary technological framework for the establishment of the fiber connections needed in systems consistent with the present invention. Known protocols for circuit-switch construction may be implemented with only minor modifications that may be appreciated through practice of the invention.

ALTERNATIVE EMBODIMENTS

Illustrative embodiments have been described, in connection with multiple fiber segments between network switches, however there are alternative embodiments. Instead of using parallel fibers, individual wavelengths within a single fiber may be used for the quantum communications channels. This embodiment leverages Dense Wavelength Division Multiplexing ("DWDM") technology. In this embodiment, a single frequency band is reserved along the entire path from an origin endpoint to a terminal endpoint. The endpoints tune lasers and photon detection devices to an appropriate frequency before exchanging QC photons. In this embodiment, unlike conventional, electro-optical, DWDM networks, photons are not regenerated at each switch. Thus a single wavelength must be reserved from endpoint to endpoint.

In another alternative embodiment, time division multiplexing ("TDM") is used in the fiber strands instead of wavelength division multiplexing. In this way, a number of different QC sessions may be multiplexed onto a single fiber by ensuring that the endpoints are time-synchronized and that each set takes a turn using the fiber. TDM further involves additional synchronization throughout the network; essentially it requires "coloring the topology graph" in order to determine free times at which a given device may transmit a photon so that it does not interfere with any other device's use of any of the fiber segments along the path. TDM also requires re-adjusting the mirrors along the path at each time slice.

CONCLUSION

Other embodiments of the invention will be apparent to those skilled in the art from consideration of the specification and practice of the invention disclosed herein. Principles of quantum mechanics are not limited to any portion of the electromagnetic spectrum. Accordingly, embodiments of the present invention are not constrained to operate only within limits of the human-visible spectrum. Therefore, the terms "light" and "light information", as used and claimed herein, are not necessarily referring to phenomena falling only within the human-visible light spectrum. These terms can be referring to phenomena occurring both within the infra-red and/or ultraviolet limits to the human-visible spectrum and beyond such limits as well. Moreover, quantum principles also apply to physical phenomena other than photons, for example, to entire atoms or their constituent components. Therefore, "light" should be understood in the broad sense of physical waves or particles, rather than its more restricted sense of photons. It is intended that the specification and examples be considered as exemplary only, with a true scope and spirit of the invention being indicated by the following claims.

I claim:

1. A method of securely transmitting light information in a network along a path comprised of a plurality of untrusted network devices, said untrusted network devices comprising a plurality of switching devices, and said method comprising:

sending at least one setup message to one of said network devices;

based on said setup message, configuring at least one of said network devices to direct said light along said path to a terminal endpoint using at least one of said switching devices, whereby a configured path is established;

sending a plurality of pulses of said light along said configured path, said pulses having a first set of randomly selected quantum bases; and measuring a quantum state of said light pulses using a second set of randomly selected quantum bases, thereby providing a measured quantum state.

2. A method according to claim 1, wherein said plurality of switching devices further comprises a plurality of optical switching devices.

3. A method according to claim 1, wherein said configured path is multiplexed onto a single fiber with at least one other quantum-cryptographic signal.

4. A method according to claim 3, wherein said configured path is multiplexed using wavelength division multiplexing.

5. A method according to claim 3, wherein said configured path is multiplexed using time division multiplexing.

6. A method according to claim 1, wherein said setup message is sent using the CR-LDP protocol.

7. A method according to claim 1, wherein said setup message is sent using the RSVP protocol.

8. A method according to claim 1, wherein said setup message is sent via a data network using TCP/IP datagrams.

9. A method according to claim 1, wherein said setup message is sent via an asynchronous-transfer-mode network.

10. A method according to claim 1, wherein said optical switching device comprises a micro-electro-mechanical system mirror array.

11. A method according to claim 1, wherein said optical switching device comprises photonic-band-gap material.

12. A method according to claim 1, wherein said optical switching device comprises a mirror.

13. A method according to claim 1, wherein said light pulse in said plurality of light pulses comprises a single polarized photon.

14. A method according to claim 1, further comprising:
establishing at least one sending quantum basis corresponding to said first set of randomly selected quantum bases;
establishing a corresponding receiving quantum basis corresponding to said second set of randomly selected quantum bases;
determining whether said sending quantum basis has an equivalent orientation to said corresponding receiving quantum basis;
discarding any improperly oriented said light pulses for which said sending quantum basis was determined to be different from said receiving quantum basis, whereby a first remaining stream of said light pulses remains;
comparing said measured quantum state of a random subset of said first remaining stream of light pulses as sent, to said first remaining stream of light pulses as received, to produce a set of variant light pulses having a quantity;
establishing a predetermined threshold against which to compare said quantity;
determining whether said quantity exceeds said predetermined threshold;
discarding said random subset of said first remaining stream of light pulses, whereby a second remaining stream of light pulses remains; and
if said predetermined threshold is not exceeded, using said second remaining stream of light pulses as a key to encrypt and decrypt data.

15. A method according to claim 14, wherein said sending and receiving quantum bases are polarization bases chosen from a group of polarization bases consisting of:
a diagonal polarization basis; and
a rectilinear polarization basis.

16. A method according to claim 14, wherein said sending and receiving quantum bases are phase-shift bases chosen from a group of phase-shift bases consisting of:
a 45 degree phase-shift basis; and
a 90 degree phase-shift basis.

17. A computer-readable medium containing instructions capable of causing at least one digital computer to securely transmit light information in a network along a path comprised of a plurality of untrusted network devices, said untrusted networking devices comprising a plurality of switching devices, said computer-readable medium comprising:
program code for sending at least one setup message to one of said network devices;
program code for configuring at least one of said network devices to direct said light along said path to a terminal endpoint using at least one of said switching devices based on said setup message, whereby a configured path is established;
program code for sending a plurality of bits using pulses of said light along said configured path, said pulses having a first set of randomly selected quantum bases; and
program code for measuring a quantum state of said light pulses using a second set of randomly selected quantum bases.

18. A method according to claim 17, wherein said plurality of switching devices further comprises a plurality of optical switching devices.

19. A system in which light information is securely transmitted in a network along a path comprised of a plurality of untrusted network devices, said plurality of untrusted network devices comprising a plurality of switching devices, said system comprising:
an electrical controller for controlling at least one of said switching devices, wherein said electrical controller orients said at least one switching device to direct optical energy along said path based on at least one setup message received by the electrical controller,
wherein said at least one of said switching devices is configured to be oriented into at least two positions;
a light sending apparatus configured to send quantum-cryptographic light pulses along said path; and
a light measuring apparatus configured to observe said quantum-cryptographic light pulses.

20. A method according to claim 19, wherein said plurality of switching devices further comprises a plurality of optical switching devices.

21. A system according to claim 19, wherein said optical switching device comprises a micro-electro-mechanical system mirror array.

22. A system according to claim 19, wherein said optical switching device comprises photonic-band-gap material.

23. A system according to claim 19, wherein said optical switching device comprises a mirror.

24. A system according to claim 19, further comprising a multiplexer configured to multiplex said configured path onto a single fiber with at least one of said quantum-cryptographic signal.

25. A system according to claim 24, wherein said multiplexer employs dense wavelength division multiplexing.

26. A system according to claim 24, wherein said multiplexer employs time division multiplexing.

27. A system according to claim 19, wherein said setup message is sent using a CR-LDP protocol.

28. A system according to claim 19, wherein said setup message is sent using an RSVP protocol.

29. A system according to claim 19, wherein said setup message is sent via a data network using TCP/IP datagrams.

30. A system according to claim 19, wherein said setup message is sent via an asynchronous-transfer-mode network.

31. A system according to claim 19, wherein said optical switching device comprises a micro-electro-mechanical system device.

32. A system according to claim 19, wherein each pulse in said quantum-cryptographic light pulses comprises a single polarized photon.

33. Apparatus operational with light and with a polarized light pulse originating from an upstream source and terminating with a downstream destination, said apparatus comprising:

at least one means for directing quantum cryptographic light pulses;

means for orienting said directing means into at least two orientations; and means for controlling said at least one directing means, wherein said controlling means is configured to, prior to receipt of quantum cryptographic light pulses, receive at least one setup message for configuring said directing means, and for causing said orienting means to orient the directing means in accordance with the setup message into an orientation that directs said quantum cryptographic light pulses from said upstream source to said downstream destination, forming a path from an origin endpoint to a terminal endpoint.

* * * * *

UNITED STATES PATENT AND TRADEMARK OFFICE
CERTIFICATE OF CORRECTION

PATENT NO. : 7,324,647 B1
APPLICATION NO. : 09/944328
DATED : January 29, 2008
INVENTOR(S) : Brig B. Elliott It is certified that error appears in the above-identified patent and that said Letters Patent is hereby corrected as shown below:

Col. 14 line 7 change "quantum cryptographic" to -- the quantum cryptographic --

Signed and Sealed this

Thirteenth Day of May, 2008

JON W. DUDAS
*Director of the United States Patent and Trademark Office*